Figure 1:
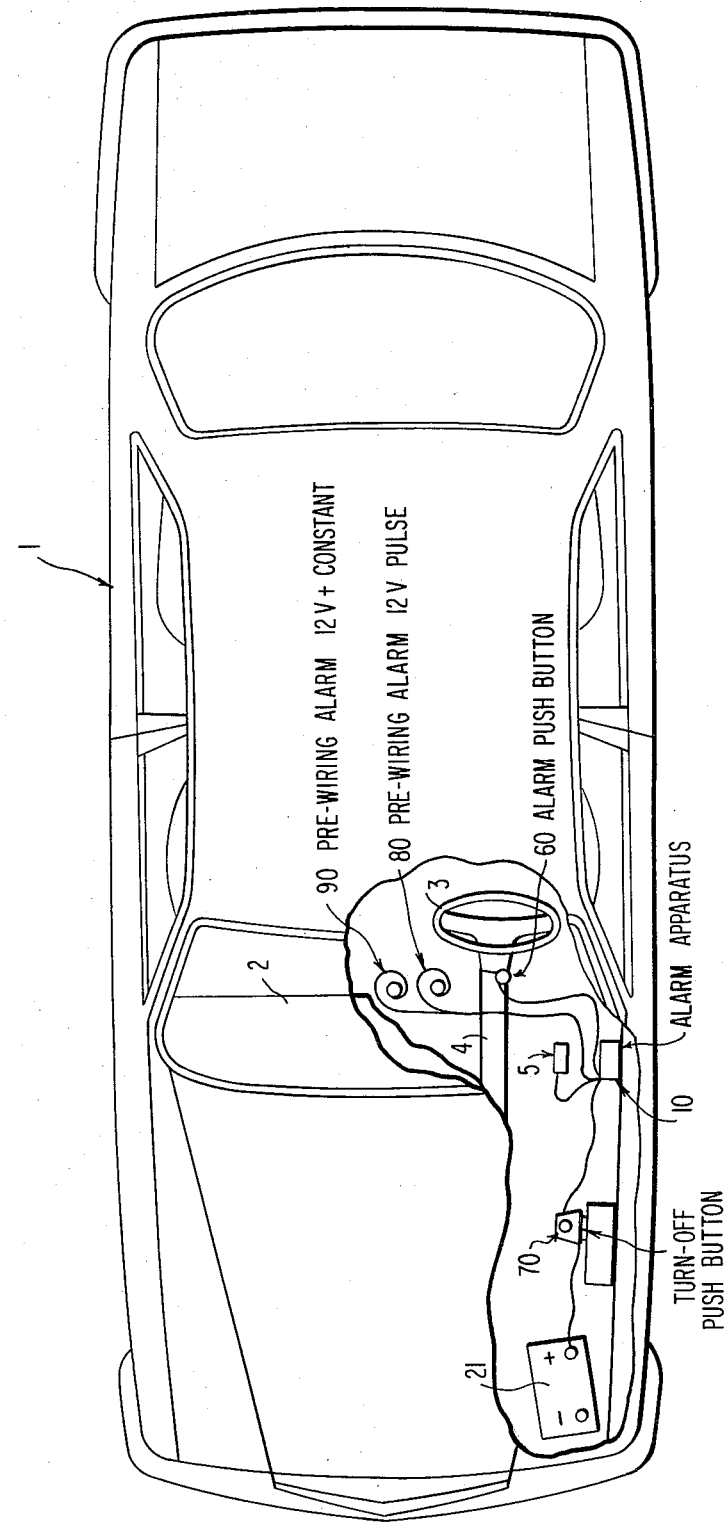

United States Patent [19]
Kehry et al.

[11] 3,913,066
[45] Oct. 14, 1975

[54] ALARM DEVICE FOR MOTOR VEHICLES

[75] Inventors: Manfred Kehry, Weil; Manfred Pospiech, Nagold, both of Germany

[73] Assignee: Daimler-Benz Aktiengesellschaft, Germany

[22] Filed: Oct. 17, 1973

[21] Appl. No.: 407,168

[30] Foreign Application Priority Data
Oct. 17, 1972 Germany............................ 2250733

[52] U.S. Cl.............. 340/63; 340/248 P; 307/10 AT
[51] Int. Cl............................................ B60r 25/10
[58] Field of Search .................... 340/63, 64, 248 P; 307/10 AT

[56] References Cited
UNITED STATES PATENTS
| | | | |
|---|---|---|---|
| 2,994,073 | 7/1961 | Pelovitz.......................... | 340/63 UX |
| 3,706,966 | 12/1972 | So........................................ | 340/63 |

*Primary Examiner*—Alvin H. Waring
*Attorney, Agent, or Firm*—Craig & Antonelli

[57] ABSTRACT

An alarm system for motor vehicles, especially taxicabs, which emits intermittent acoustic and/or optical alarm signals by way of devices already present in the vehicle, such as the signalling horn, the headlights, the warning blinker system, etc., by the use of a pulse transmitter which is adapted to be turned on by way of a push button reachable from the driver seat and is again adapted to be turned off by way of a further push button reachable only from the outside; the input of the signals from the alarm system into the electrical wiring system of the vehicle thereby takes place by way of a multi-pole adaptor plug without change in the series-produced electrical system of the vehicle while a blinker device which is already present in the vehicle, e.g., for emergency stoppage, is used as alarm pulse transmitter.

27 Claims, 2 Drawing Figures

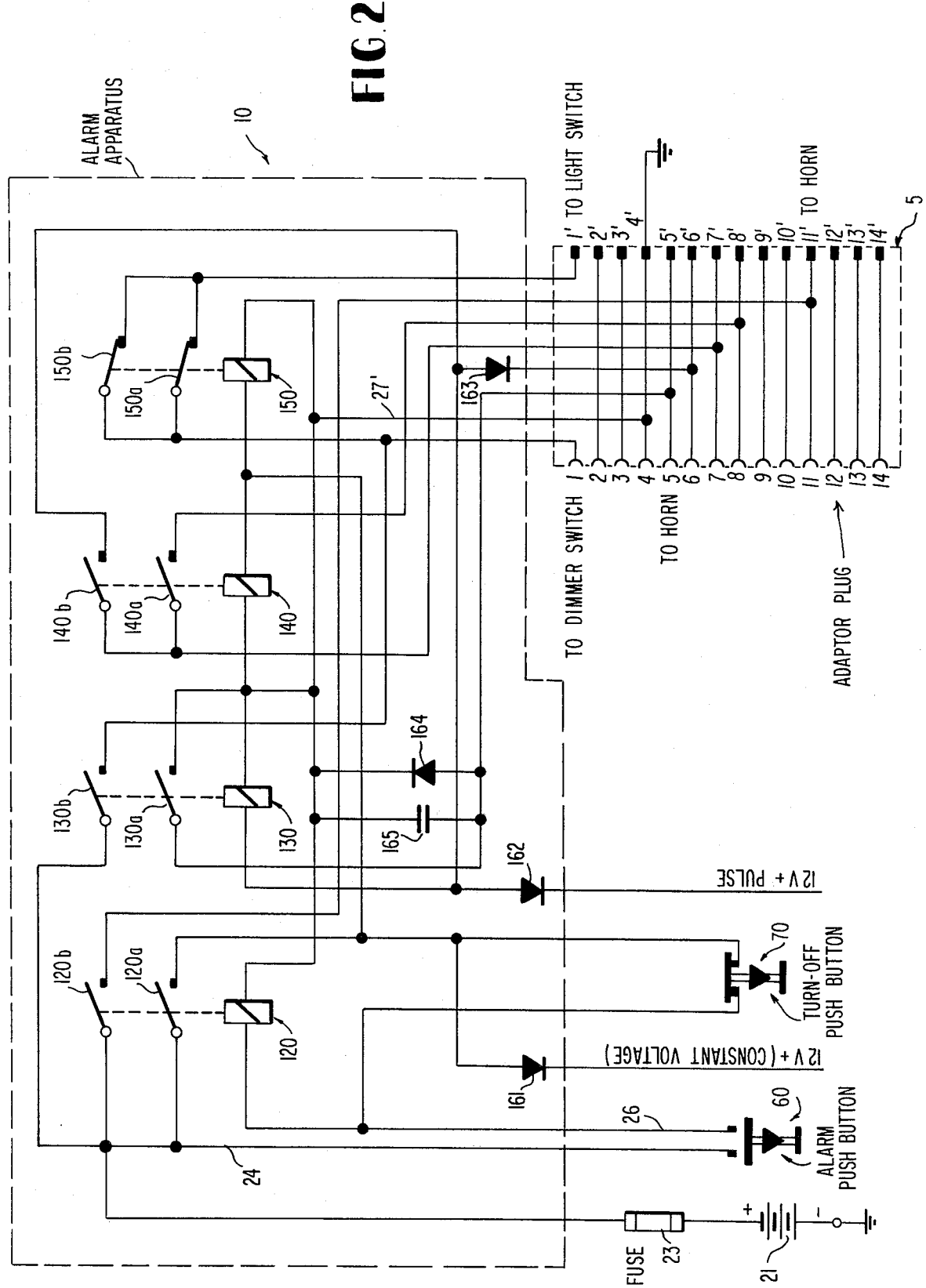

ALARM DEVICE FOR MOTOR VEHICLES

The present invention relates to an alarm system for motor vehicles, especially taxis, for the emission of intermittent acoustic and/or optical alarm signals by way of installations already present in the vehicle, such as signalling horn, headlights, warning blinker systems, etc., by means of a pulse transmitter, adapted to be turned on by way of a push-button reachable from the driver seat and adapted to be turned off by way of a further push-button reachable only from the outside.

Alarm systems, as known in the prior art, entail the disadvantage that their connections with the power supply and electrical wiring system of the vehicle have to be made individually according to a circuit diagram. This requires highly qualified motor vehicle electricians and long periods of time for the installation whereby, in case of subsequent installation, additionally long standstill periods result. The pulse transmitters installed into known alarm systems increase the cost of acquisition of such apparatus and form in case of failure an additional source of trouble.

It is the aim of the present invention to provide an alarm system which does not entail the aforementioned shortcomings and drawbacks, which can be installed in a short period of time also by persons who are not experts, which requires lower initial costs and causes fewer failures and troubles.

The underlying problems are solved according to the present invention in that the feed-in or input of the signals coming from the alarm installation into the electrical wiring system of the vehicle takes place by the use of a multi-pole adaptor plug without change of the series-produced electrical system of the vehicle and in that the the blinker device which is normally already present in the series-produced vehicle, is used as alarm pulse transmitter.

Accordingly, it is an object of the present invention to provide an alarm system for motor vehicles which avoids by simple means the aforementioned shortcomings and drawbacks encountered in the prior art.

Another object of the present invention resides in an alarm system for the motor vehicles which greatly facilitates the installation of the alarm system.

A further object of the present invention resides in an alarm system for motor vehicles of the type described above which eliminates the need for highly qualified motor vehicle electricians and long periods of time for the installation thereof.

still a further object of the present invention resides in an alarm system for motor vehicles, especially taxi-cabs, which permits the ready installation thereof, even subsequent to the initial delivery of the vehicle to the customer, thereby eliminating long periods of down-time.

Another object of the present invention resides in an alarm installation for motor vehicles of the type described above which is very simple in construction and relatively inexpensive in initial cost while at the same time minimizing the likelihood of troubles.

These and other objects, features and advantages of the present invention will become more apparent from the following description when taken in connection with the accompanying drawing which shows, for purposes of illustration only, one embodiment in accordance with the present invention, and wherein:

FIG. 1 is a schematic plan view of a passenger motor vehicle equipped with an alarm system in accordance with the present invention; and FIG. 2 is a schematic wiring diagram of the alarm apparatus and multi-pole adaptor plug used in the system according to the present invention.

Referring now to the drawing wherein like reference numerals are used throughout the various views to designate like parts, and more particularly to FIG. 1, reference numeral 1 generally designates in this figure a passenger motor vehicle, and more particularly a conventional taxi equipped with an alarm system in accordance with the present invention. The motor vehicle includes, inter alia, the usual instrument panel 2 and a steering system including a steering wheel 3 and a steering column 4. Since the details of the motor vehicle are conventional as such, a detailed description thereof is dispensed with herein except for those parts of significance to this invention.

The alarm system according to the present invention includes an alarm apparatus generally designated by reference numeral 10 which contains the various control relays and electrical components and which may be accommodated, for example, in proximity to the usual foot pedal for engaging the hand brake within the foot space of the driver alongside the inner side wall of the vehicle. FIG. 1 thereby illustrates only one possible location of the various components of the alarm system in accordance with the present invention, in which the various components are indicated only schematically. Of course, other arrangements are also feasible within the scope of this invention.

The alarm push button generally designated by reference numeral 60 is located within easy reach of the driver, for example, at the steering column 4 underneath the impact pot of the safety steering device. The turn-off push-button generally designated by reference numeral 70, on the other hand, is located in the engine compartment underneath the hood.

The electrical system is fed from a conventional vehicle battery 21 and the electrical connections are readily established by the use of a multipole adaptor plug generally designated by reference numeral 5 which may be arranged at any suitable place, for example, underneath or behind the instrument panel. The adaptor plug 5 is thereby pre-wired and constructed in such a manner that no changes are required in the electrical system as provided in the series-produced vehicle. In FIG. 1, reference numeral 80 schematically indicates a pre-wiring for the dome sign or light, normally mounted on the roof of the vehicle in taxi-cabs, while reference numeral 90 generally designates a pre-wiring for the radio transmitter if the vehicle is equipped with a two-way radio. The purpose of the pre-wirings 80 and 90 is to permit ready interconnection with the dome light and the transmitter so that, in case the alarm is given by depressing the alarm push-button 60, the dome light is intermittently energized to provide a flashing signal and the transmitter is automatically turned on so that the dispatcher is able to listen to the happenings in the taxi during the alarm period.

Turning now to the circuit diagram of FIG. 2, the battery 21 is connected with the alarm apparatus generally designated by reference numeral 10 by way of a fuse 23 or similar device, and more particularly with an energizing circuit for relay 120 which includes the alarm push-button 60. Upon depressing the alarm push-button 60, the winding of relay generally designated by reference numeral 120 is energized so that its contacts 120a and 120b close. Contact 120a thereby closes a holding circuit for keeping the coil of relay 120 energized after release of the alarm push-button 60, by way of the series-circuit including the turn-off push button 70. Contact 120b provides an energizing circuit for a relay generally designated by reference numeral 140 which, upon energization, closes its contacts 140a and 140b. Closure of contacts 140a and 140b by energization of relay 140, in turn, will cause—by way of the circuit connections between terminals 7, 7' and terminals 6, 6' and 8, 8'—the connection of all four turn indicator lights to the warning blinker transmitter (not shown) of conventional construction as well as the application of the blinker pulses to the energizing coil of a relay generally designated by reference numeral 130 which includes contacts 130a and 130b. The external circuit connection from terminals 6, 6'; 7, 7' and 8, 8' are thereby conventional and therefore not illustrated in FIG. 2. Every time relay 130 is energized by a pulse from the warning blinker pulse transmitter, the headlights are also energized by closure of contact 130b, thereby applying positive battery voltage pulses to terminal 1 of adaptor plug 5, to which is connected the dimmer switch, while the negative voltage pulses from the negative terminal of the battery, for example, connected to ground, are applied by way of contact 130a to the signalling horn (not shown) which is connected to terminal 5 or 5' of adaptor plug 5. The high or low beams, depending on the position of the dimmer switch (not shown), are thereby energized by application of the positive voltage pulses to the terminal 1 of the multi-pole plug 5 when contact 130b closes.

Relay generally designated by reference numeral 150 includes two contacts 150a and 150b connected in parallel which are normally closed when the relay is de-energized. Contacts 150a and 150b thereby connect the conventional light switch (not shown), connected to terminal 1' of the adaptor plug with the dimmer switch connected to terminal 1 of the multi-pole adaptor plug 5. Upon energization of the coil of relay 150, after closing of contact 120a of relay 120, the connection from the light switch to the dimmer switch is therefore interrupted by relay 150 which then opens its contacts 150a and 150b. The application of voltage pulses to the relay 130 provides, as described above, positive voltage pulses for the headlights and negative voltage pulses for the signalling horn.

In order that the signalling horn, whose positive terminal is de-energized or disconnected when the ignition key is turned off, be able to operate even if the ignition is turned off or the ignition key is removed, the positive terminal of the battery 21 is connected to the signalling horn by closure of relay 120b and by way of terminal 11 or 11' of the multi-pole plug.

The diode 161 prevents the reverse flow of current to relay 120, 140 and 150 when the radio transmitter is turned on. The diode 162 prevents the reverse flow of current to relay 130 and the taxi's dome-light when the warning blinker system or directional turn indicator system is normally turned on, i.e., is turned on under normal conditions. The diode 163 prevents the reverse flow of current to the blinker lights and to the coil of relay 130 when the dome light of the taxi is normally turned on. Diode 164 and condenser 165 represent a protective circuit for the operating contact 130a of the signalling horn (not shown) which is necessitated by reason of the existing inductive load.

As can be readily seen from the diagram in FIG. 2, when the alarm push-button 60 is depressed, the system will function as described hereinabove by applying the intermittent pulses to all four signalling lights of the vehicle, to the headlights and to the dome light. Additionally, a constant positive voltage is applied to the radio transmitter. This alarm operation continues until the turn-off push button 70 is depressed which will open up the holding circuit for the relay 120. Since the turn-off push button 70 is located underneath the hood within the engine compartment or in some other location accessible only from the outside, it cannot be turned off from within the cab, thus representing a highly effective alarm system.

Since the remaining electrical circuits of conventional type remain unaffected by the alarm system of the present invention, a detailed description thereof is dispensed with herein.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. In an alarm installation for a vehicle, said vehicle having an electrical system with a source of electrical power, signalling means operatively connected to said electrical system for activation by the power source, and pulse transmitter means connected to said electrical system for providing intermittent signals to said signalling means, the alarm installation comprising circuit means for producing alarm signals, said circuit means being connected to said pulse transmitter means for providing intermittent alarm signals, and multi-pole adapter plug means connected to said circuit means for supplying said alarm signals to said signalling means, said multi-pole adapter plug means introducing said alarm signals into said electrical system for activating said signalling means substantially without change of said electrical system.

2. An alarm installation according to claim 1, wherein said vehicle is a taxi.

3. An alarm installation according to claim 1, further comprising a first actuating means reachable from the driver seat for actuating the alarm installation, and a second actuating means reachable only from the outside of said vehicle for exclusively turning off the alarm installation.

4. An alarm installation according to claim 3, wherein said first and second actuating means include push button switches.

5. An alarm installation according to claim 3, wherein said signalling means includes at least one of signalling lights, headlights and a signalling horn, and wherein said alarm installation applies voltage pulses to the signalling means.

6. An alarm installation according to claim 5, wherein said vehicle is a taxi with a dome light, said voltage pulses being applied to said dome light upon actuation of said first actuating means.

7. An alarm installation according to claim 6, wherein said circuit means comprise a first relay means energized upon actuation of said first actuating means, said first relay means including normally open contact means being closed upon energization of said first relay means, said first relay means further including a holding circuit being activated by the closed contact means of said first relay means; second relay means having normally open contact means, said second relay means being energized by said first relay means to close the contact means of said second relay means such that pulses from the pulse transmitter means are applied to said signalling means; and third relay means having normally open contact means, said third relay means being energized by said second relay means such that said normally open contact means are closed to apply said voltage pulses to the headlights.

8. An alarm installation according to claim 7, wherein said electrical system further includes an ignition switch selectively connecting one terminal of the electric power source to a control circuit for said signalling horn, and wherein said third relay means includes further contact means for connecting said one terminal to said control circuit upon disconnection of said ignition switch.

9. An alarm installation according to claim 8, wherein said electrical system further includes a light switch and a dimmer switch, further comprising fourth relay means having normally closed contact means for interconnecting said dimmer switch with said light switch by means of said multi-pole adapter plug means, said fourth relay means being energized by closure of the contact means of said first relay means such that the connection between said light switch and said dimmer switch is interrupted upon opening of the contact means of said fourth relay means.

10. An alarm installation according to claim 9, wherein said first and second actuating means include push button switches.

11. An alarm installation according to claim 1, wherein said signalling means includes at least one of signalling lights, headlights and a signalling horn, and wherein said alarm installation applies voltage pulses to the signalling means.

12. An alarm installation according to claim 11, wherein said vehicle is a taxi with a dome light, said voltage pulses being applied to said dome light upon actuation of said first actuating means.

13. An alarm installation according to claim 1, wherein said circuit means comprise a first relay means energized upon actuation of first actuating means, said first relay means including normally open contact means being closed upon energization of said first relay means, said first relay means further including a holding circuit being activated by the closed contact means of said first relay means; second relay means having normally open contact means, said second relay means being energized by said first relay means to close the contact means of said second relay means such that pulses from the pulse transmitter means are applied to said signalling means; and third relay means having normally open contact means, said third relay means being energized by said second relay means such that said normally open contact means are closed to apply said voltage pulses to the headlights.

14. An alarm installation according to claim 13, wherein said electrical system further includes an ignition switch selectively connecting one terminal of the electric power source to a control circuit for said signalling horn, and wherein said third relay means includes further contact means for connecting said one terminal to said control circuit upon disconnection of said ignition switch.

15. An alarm installation according to claim 14, wherein said electrical system further includes a light switch and a dimmer switch, further comprising fourth relay means having normally closed contact means for interconnecting said dimmer switch with said light switch by means of said multi-pole adapter plug means, said fourth relay means being energized by closure of the contact means of said first relay means such that the connection between said light switch and said dimmer switch is interrupted upon opening of the contact means of said fourth relay means.

16. An alarm installation according to claim 13, wherein said electrical system further includes a light switch and a dimmer switch, further comprising fourth relay means having normally closed contact means for interconnecting said dimmer switch with said light switch by means of said multi-pole adapter plug means, said fourth relay means being energized by closure of the contact means of said first relay means such that the connection between said light switch and said dimmer switch is interrupted upon opening of the contact means of said fourth relay means.

17. An alarm installation according to claim 1, wherein said signalling means includes a plurality of indicating devices, said alarm signals being selectively supplied to individual ones of said plurality of indicating devices by said multi-pole adapter plug means.

18. An alarm installation according to claim 1, wherein said signalling means include emergency blinking lights of the vehicle.

19. An alarm system comprising:
an electrical system including a source of electrical power, signalling means operatively connected to said electrical system for activation by the source of electrical power, and pulse transmitter means connected to said electrical system for providing intermittent signals to said signalling means;
circuit means for producing alarm signals, said circuit means being connected to said pulse transmitter means for providing intermittent alarm signals; and
multi-pole adapter plug means connected to said circuit means for supplying said alarm signals to said signalling means, said multi-pole adapter plug means introducing said alarm signals into said electrical system for activating said signalling means substantially without change of said electrical system.

20. An alarm system according to claim 19, further comprising a first actuating means for actuating said circuit means, said first actuating means being located at a first position, and second actuating means for exclusively deactivating said circuit means, said second actuating means being located at a second separate position from said first actuating means.

21. An alarm system according to claim 20, wherein said first and second actuating means include push button switches.

22. An alarm system according to claim 19, wherein said signalling means include at least one of lights and horns, and wherein said intermittent alarm signals are applied to said signalling means in the form of voltage pulses.

23. An alarm system according to claim 19, wherein said circuit means comprise a first relay means energized upon actuation of first actuating means, said first relay means including normally open contact means being closed upon energization of said first relay means, said first relay means further including a holding circuit being activated by the closed contact means of said first relay means; second relay means having normally open contact means, said second relay means being energized by said first relay means to close the contact means of said second relay means such that pulses from the pulse transmitter means are applied to said signalling means; and third relay means having normally open contact means, said third relay means being energized by said second relay means such that said normally open contact means are closed to apply said voltage pulses to a light means.

24. An alarm system according to claim 23, wherein a switch means selectively connecting one terminal of said source of electrical power to a control circuit for a signalling horn, and wherein said third relay means includes further contact means for connecting said one terminal to said control circuit upon disconnection of said switch means.

25. An alarm system according to claim 24, wherein said electrical system further includes a light switch and a dimmer switch, further comprising fourth relay means having normally closed contact means for interconnecting said dimmer switch with said light switch by means of said multi-pole adapter plug means, said fourth relay means being energized by closure of the contact means of said first relay means such that the connection between said light switch and said dimmer switch is interrupted upon opening of the contact means of said fourth relay means.

26. An alarm system according to claim 19, wherein said signalling means includes a plurality of indicating devices, said alarm signals being selectively supplied to individual ones of said plurality of indicating devices by said multi-pole adapter plug means.

27. An alarm system according to claim 26, wherein said signalling means include emergency blinking lights.

* * * * *